Patented Nov. 5, 1940

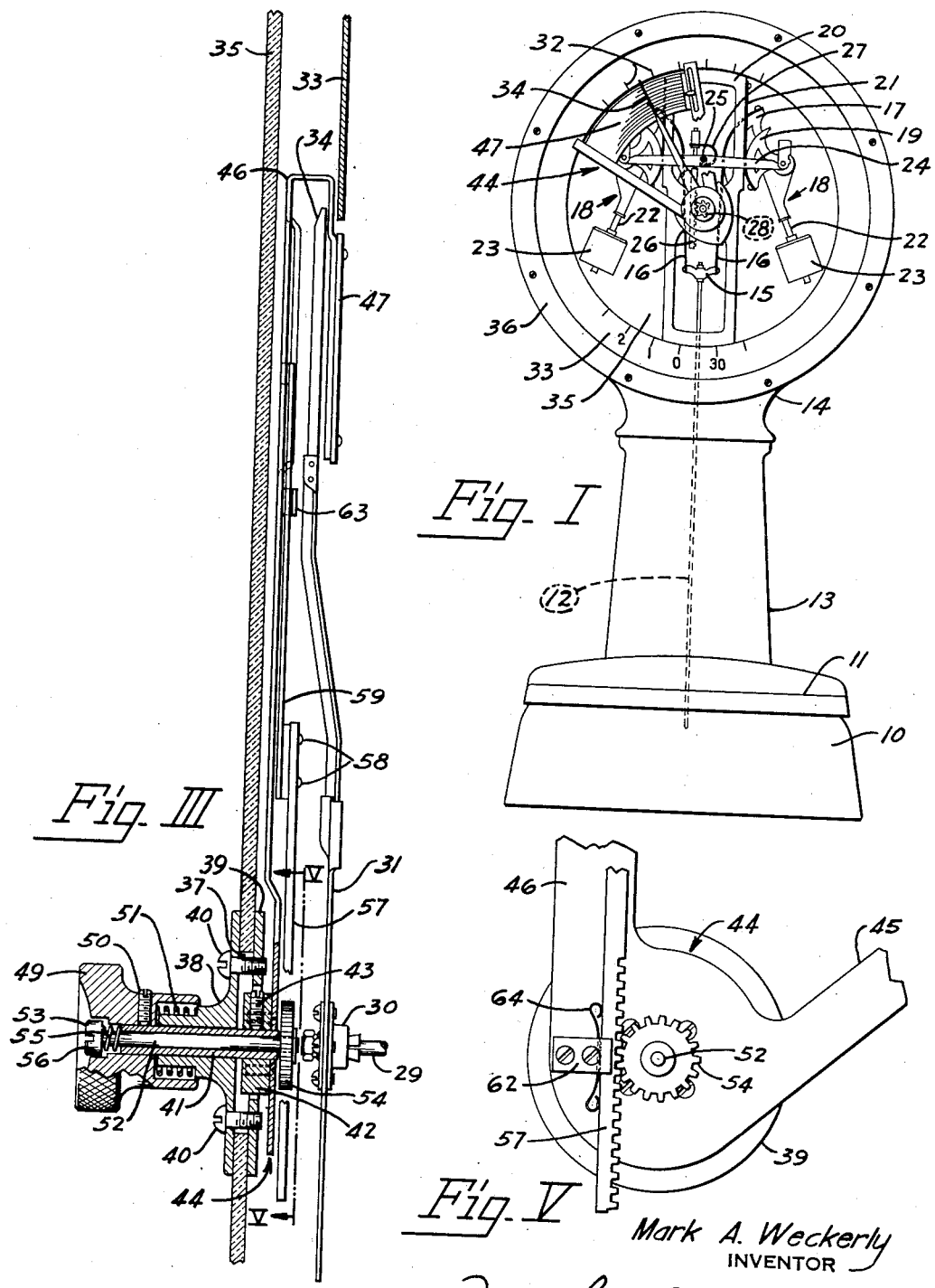

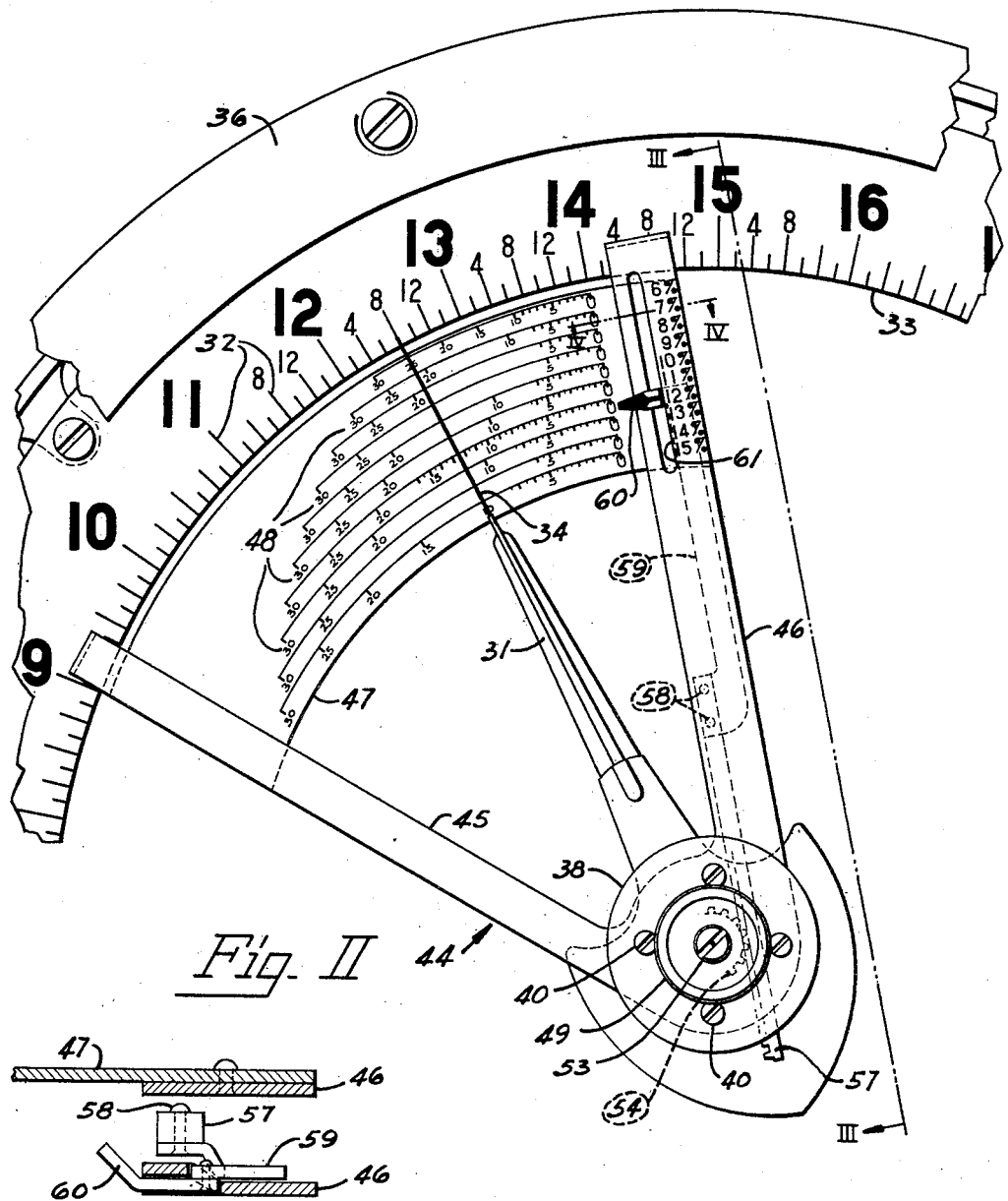

2,220,668

UNITED STATES PATENT OFFICE 2,220,668

WEIGHING SCALE

Mark A. Weckerly, Toledo, Ohio, assignor to Toledo Scale Company, Toledo, Ohio, a corporation of New Jersey Application September 13, 1938, Serial No. 229,694

8 Claims. (Cl. 265—29)

This invention relates generally to percentage indicating scales, and more particularly to scales employed to indicate when the weight of a commodity being processed has been varied by a predetermined percentage and more specifically for determining the amount of pickling brine which is to be injected into cuts of meat, such as, hams, briskets, tongues and the like.

The pickling, or preserving solution, in the injection method may be directly introduced into the muscles through hollow needles or it may be pumped into the vascular passages. In the operation of curing hams it is preferably pumped into the iliac artery.

The principal object of this invention is the provision of improved means in a device to determine when a predetermined percentual amount of a substance has been added to a commodity on the platform of the scale.

A further object is to provide such means which are capable of use with the minimum of mental effort; and, A still further object is the provision of improved means whereby such means may be incorporated into standard automatic weighing scales.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevational view of a standard automatic weighing scale embodying the invention.

Fig. II is an enlarged fragmentary front elevational view of the automatic and manipulative indicating means.

Fig. III is a side elevation thereof as viewed from along the line III—III of Fig. II.

Fig. IV is a transverse section along the line IV—IV through a portion of the manipulative indicating means as shown in Fig. II; and, Fig. V is an enlarged fragmentary view of means for manually adjusting a pointer, substantially as seen from along the line V—V of Fig. III.

The device consists of a hollow base 10 containing the usual load supporting lever mechanism (not shown) upon which a platform 11 is pivotally mounted. The lever mechanism is connected by means of a rod 12 extending upwardly through a column 13 mounted on a projecting portion of the base 10 into a substantially watchcase-shaped housing 14 surmounting the column 13. The upper end of this rod 12 has rigidly connected thereto a cross head 15 to which the lower ends of flexible metallic ribbons 16 are clamped. The upper ends of these ribbons 16 overlie and are fastened to arcuate faces of power sectors 17 of load counterbalancing pendulums 18. Each of these pendulums 18 is also provided with a pair of fulcrum sectors 19 and is suspended from a vertically positioned track 20 by means of ribbons 21 whose upper ends are fastened to the track member 20 and whose lower ends overlie and are fastened to the arcuate face of the fulcrum sectors. A downwardly extending stem 22 has a pendulum weight 23 adjustably mounted thereon. Compensating bars 24 pivotally engage the centers of rotation of the two pendulums and on a shaft 25, engaging the compensating bars 24 midway between their ends, a rack 26 is mounted by means of a flexible compensating plate 27. The teeth of this rack 26 engage the teeth of a pinion 28 circumjacently mounted upon a shaft 29 fulcrumed in ball bearings (not shown) in a transverse flange of the track member 20. By means of a suitable hub 30, an indicator 31 is clamped to the shaft 29 whose upper end is adapted to cooperate with weight indicia 32 marked upon an annular chart 33 and suitably mounted in the housing 14 in the usual manner to visually indicate the weight of the load on the platform.

The free end of the indicator 31, for a purpose which will later become clear, is provided with an index 34 which is preferably of thin tempered steel and riveted to the heavier body portion. The open face of the housing is enclosed by a transparent glass plate 35 and is retained by an annular frame 36.

The scale thus far described is of standard construction in which are incorporated the hereinafter described novel features of the instant invention.

The glass plate 35 is provided with an aperture 37 concentrically disposed with respect to the axis of the shaft 29. A flanged bushing 38 is disposed concentrically with the opening 37 and clamped to the glass plate 35 by the cooperation of a washer 39 and screws 40, and located within the bushing, in horizontal alignment with the shaft 29, is a freely rotatable sleeve 41. On that portion of the sleeve 41 which extends into the interior of the housing is clamped, by means of a screw 43, a hub 42, to which a forked auxiliary chart frame 44 is fastened. The upper ends of arms 45 and 46 of this frame 44 are bent to substantial U shape and have riveted thereto an auxiliary chart 47 which is positioned in the plane of the annular chart 33. On the face of this chart 47 are marked a plurality of concentric rows 48 of indicia. The length of each of these rows is a percentual fraction of the length of the row of indicia 32 on the chart 33 and each is similarly graduated so that the distance between any two graduations is a percentual fraction of the distance between the two corresponding graduations in the row 32 on the chart 33; for example, the distance between the zero indicium and the 12 pounds 8 oz. graduation on the twelve percentum row 48 is exactly twelve percentum of the distance between the zero mark and the 12 lb. 8 oz. indicium of the indicia 32 on the annular chart 33. Thus when corresponding indicia on the main chart and the auxiliary chart are both in registration with the indicator, the zero marks on the auxiliary chart each constitutes a total weight indicium with which the indicator will register when a definite percentage has been added to the load on the scale. In the illustrated embodiment of the invention the percentages range from 6 to 15% of the capacity of the chart 33.

To enable the operator to turn the auxiliary chart frame 44 and the thereto attached percentage chart 47 into proper operative position, that portion of the sleeve 41 which projects beyond the bushing 38 on the exterior of the housing, is provided with a hand knob 49 and locked thereon by means of a set screw 50. The rear end of the knob 49 is counterbored to telescope over a turned down portion of the bushing 38 and a helical spring 51 between the face of the counterbore and the shoulder of the turned down portion is provided to exert sufficient friction on the knob 49 to maintain the frame 44 with chart 47 in adjusted position.

So that the operator may quickly select the proper row 48 of percentage indicia on the chart 47 a pinion shaft 52 is projectingly mounted in the sleeve 41. The forward end of the pinion shaft 52 is provided with an enlarged slotted head 53 and to the rearwardly projecting end is securely fastened a pinion 54. A helical friction spring 55 is seated between the underside of the slotted head 53 and the end of the sleeve 41, to prevent accidental rotation of the shaft 52. This head 53 is located within a counterbore 56 in the hand knob 49 so that it offers no obstruction during the manipulation of the knob. The teeth of the pinion 54 are adapted to mesh with the teeth of a rack 57 riveted at 58 to an L shaped and formed projection of a relatively narrow pointer plate 59 to whose upper end a bent pointer 60 is riveted so that it extends laterally through a slot 61 in a downwardly bent portion of the arm 46 of the auxiliary chart frame. The rack and the thereto attached pointer plate are guided by formed brackets 62 and 63 securely fastened to the arm 46. To insure constant engagement of the teeth of the rack 57 and the teeth of the pinion 54 and to eliminate lost motion, a formed spring 64 cooperates with the guide 62 in maintaining their operative engagement.

Assuming that a ham weighing 12 lbs. 8 oz. is to be loaded by the pumping method with pickling brine amounting to 12% of its weight, the operator, by means of a screw driver, turns the head 53 of the pinion shaft 52 either in a clockwise or anticlockwise direction, depending upon its initial position, until through the cooperation of the pinion 54, the members 57 and 59, the index 60 is moved into coincidence with the series 48 of indicia on the chart 47 representing 12% of the chart capacity (Fig. II). When the ham is placed on the platform 11 the indicator 31 will register with the 12 lb. 8 oz. indicium on the chart 33. The operator, by means of the hand knob 49, turns the frame 44 with the thereto attached percentage chart against the friction of the spring 51 until the 12 lb. 8 oz. indicium on the selected indicia series 48 lies beneath the index 34 of the indicator 31. The operator then injects brine into the ham; this increases its weight and consequently the indicator 34 advances in a clockwise direction. When the index 34 of the hand 31 overlies the zero mark of the selected row he immediately stops the flow of the pickling liquid into the ham. The tip of the index 34 also indicates on the chart 33 the gross weight of the ham and pickling brine. The ham now contains pickling brine weighing exactly 12% of its green weight and it is ready for further processing.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism, a main chart bearing a row of indicia, a relatively movable auxiliary chart bearing a plurality of rows corresponding to said row on said main chart, the length of each of said corresponding rows of indicia being a different percentual fraction of the length of said row on said main chart, an indicator mounted on said auxiliary chart and manipulative means for moving said indicator into registration with one of said rows of indicia on said chart.

2. In a device of the class described, in combination, weighing mechanism, a plurality of relatively movable charts, an indicator adjustably mounted on one of said relatively movable charts, a housing for enclosing said weighing mechanism and said relatively movable charts, means stationed exteriorly of said housing for moving said indicator along said chart, said means comprising a rack secured to said indicator, a pivoted shaft, a pinion for cooperation with said rack and means for turning said pivoted shaft.

3. In a device of the class described, in combination, weighing mechanism, indicating means comprising a main chart bearing weight indicia and an indicator cooperating therewith, the indicia on said main chart being arranged in arithmetical series ascending in one direction and being located according to the various weights represented by them, an auxiliary chart bearing a total weight indicium and other uniformly distributed indicia corresponding respectively to indicia on said main chart but being arranged in arithmetical series ascending in the opposite direction and being located according to a definite percentage of the various weights represented by the respective corresponding indicia on said main chart, means whereby said indicator is moved into registration with an indicium on said main chart indicative of the load being weighed by said weighing mechanism, and manually operable means to position said auxiliary chart with a corresponding auxiliary chart indicium in registration with said indicator and thereby position said total weight indicium to register with said indicator when said load plus said definite percentage thereof is weighed by said weighing mechanism.

4. In a device of the class described, in combination, weighing mechanism, a main chart bearing weight indicia, an indicator cooperating therewith, the indicia on said main chart being arranged in arithmetical series ascending in one direction and being located according to the various weights represented by them, an auxiliary chart bearing a plurality of rows of indicia, each row having a total weight indicium and other uniformly distributed indicia corresponding respectively to indicia on said main chart, the indicia of each row on said auxiliary chart being arranged in arithmetical series ascending in a direction opposite to the direction of ascent of the main chart indicia, and being located according to a definite percentage of the various weights represented by the respective corresponding indicia on said main chart, means whereby said indicator is moved into registration with an indicium on said main chart indicative of a load being weighed by said weighing mechanism, and manually operable means to position said auxiliary chart with a corresponding indicium of one of its rows in registration with said indicator and thereby position the total weight indicium of that row to register with said indicator when said load plus a definite percentage thereof is weighed by said weighing mechanism.

5. In a device of the class described, in combination, weighing mechanism, a main chart bearing weight indicia, an indicator cooperating therewith, the indicia on said main chart being arranged in arithmetical series ascending in one direction and being located according to the various weights represented by them, an auxiliary chart bearing a plurality of rows of indicia, each row having a total weight indicium and other uniformly distributed indicia corresponding respectively to indicia on said main chart, the indicia of each row on said auxiliary chart being arranged in arithmetical series ascending in a direction opposite to the direction of ascent of the main chart indicia, and being located according to a definite percentage of the various weights represented by the respective corresponding indicia on said main chart, means whereby said indicator is moved into registration with an indicium on said main chart indicative of a load being weighed by said weighing mechanism, and manually operable means to position said auxiliary chart with a corresponding indicium of one of its rows in registration with said indicator and thereby position the total weight indicium of that row to register with said indicator when said load plus a definite percentage thereof is weighed by said weighing mechanism, and a manually settable pointer for designating a selected row of auxiliary chart indicia.

6. In a device of the class described, in combination, weighing mechanism, indicating means comprising a main chart bearing weight indicia and an indicator cooperating therewith, the indicia on said main chart being arranged in arithmetical series ascending in one direction and being located according to the various weights represented by them, an auxiliary chart bearing uniformly distributed indicia corresponding respectively to indicia on said main chart but being located according to a definite percentage of the various weights represented by the respective corresponding indicia on said main chart, means whereby said indicator is moved into registration with an indicium on said main chart indicative of a load being weighed by said weighing mechanism, and manually operable means to position said auxiliary chart with a corresponding auxiliary chart indicium located to cause said auxiliary chart to cooperate with said indicator in indicating the total weight when said load plus said definite percentage thereof is weighed by said weighing mechanism.

7. In a device of the class described, in combination, weighing mechanism, indicating means comprising a main chart bearing weight indicia and an indicator cooperating therewith, the indicia on said main chart being arranged in arithmetical series ascending in one direction and being located according to the various weights represented by them, an auxiliary chart bearing uniformly distributed indicia corresponding respectively to indicia on said main chart but being located according to a definite percentage of the various weights represented by the corresponding indicia on said main chart, means whereby said indicator is caused to register with an indicium on said main chart indicative of a load being weighed by said weighing mechanism, and manually operable means to position said auxiliary chart with a corresponding auxiliary chart indicium in such relation to said indicating means as to cause said auxiliary chart to cooperate with said indicating means in indicating when a definite percentage of said load has been added thereto and the total load thus augmented is weighed by said weighing mechanism.

8. In a device of the class described, in combination, weighing mechanism, indicating means comprising a main chart bearing weight indicia and an indicator cooperating therewith, the indicia on said main chart being arranged in arithmetical series ascending in one direction and being located according to the various weights represented by them, an auxiliary chart bearing a plurality of rows of indicia, the indicia of each row being uniformly spaced and corresponding respectively to indicia on said main chart but being located according to a definite percentage of the various weights represented by the respective corresponding indicia on said main chart, the percentages according to which the indicia of each row are located being different, means whereby said indicator is caused to register with an indicium on said main chart indicative of a load being weighed by said weighing mechanism, and manually operable means to position said auxiliary chart to cause the indicia of one row thereof to cooperate with said indicator in indicating when said load plus a definite percentage thereof is being weighed by said weighing mechanism.

MARK A. WECKERLY.